April 7, 1953  A. E. HERNÁNDEZ ET AL  2,633,883
COCONUT SHREDDER

Filed July 5, 1950  2 SHEETS—SHEET 1

INVENTOR.
Marciano Pinca,
Angel E. Hernandez,
BY Victor J. Evans & Co.

ATTORNEYS

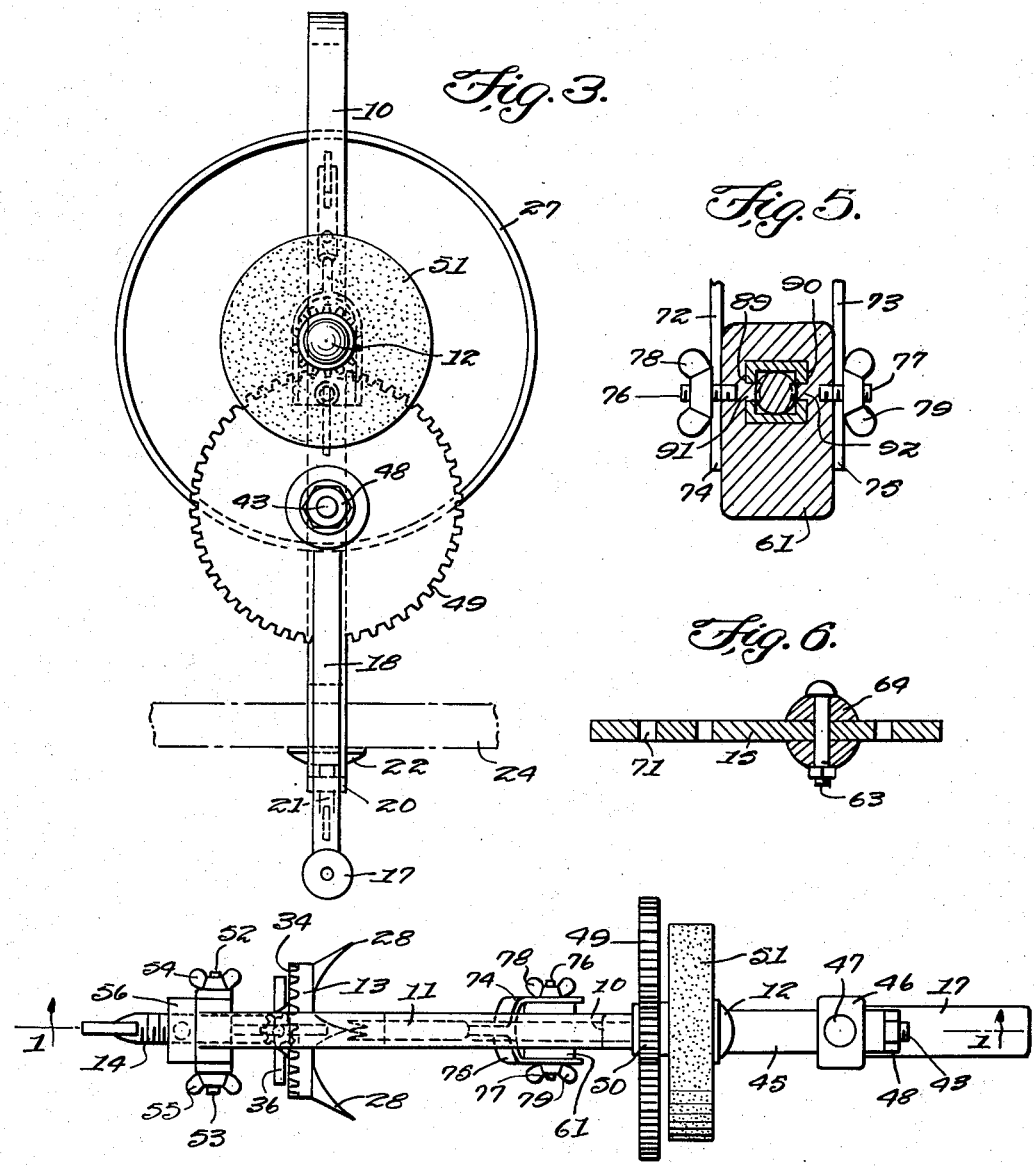

Patented Apr. 7, 1953

2,633,883

UNITED STATES PATENT OFFICE 2,633,883

COCONUT SHREDDER

Angel E. Hernández and Marciano Pinca,
Catarman, Samar, Philippine Islands

Application July 5, 1950, Serial No. 172,173

5 Claims. (Cl. 146—7)

This invention relates to utensils particularly of the egg beater type in which a supporting frame is clamped to the edge of a table, or the like, and in particular this invention relates to a machine actuated by a hand crank for shredding the meat from halves or parts of coconuts.

The purpose of this invention is to provide means for clamping part of a coconut or the like while shredding elements are actuated with a rotatable and at the same time advancing movement to shred the meat therefrom.

In the usual method of shredding coconut in the Philippines a half round blade with a saw tooth edge is attached to the end of a stick mounted on legs and the coconut is worked over the end of the blade whereby the meat is shredded from the shell. By this means it is necessary to hold the part of the coconut being shredded in the hand and it is not only difficult to hold the coconut in the shredding position but with this conventional method there is danger of injuring the hands. With this thought in mind this invention contemplates a coconut shredder in which part of the coconut is clamped in a frame with the meat exposed and shredding knives are actuated over the meat until the meat is removed from the inner surface of the shell.

The object of this invention is, therefore, to provide means for clamping part of a coconut in shredding position and also means for actuating shredding elements over the inner surface of the part of the coconut.

Another object of the invention is to provide a coconut shredder in which uneven sections of coconuts may be shredded.

A further object of the invention is to provide a coconut shredder which is of a comparatively simple and economical construction.

With these and other objects and advantages in view the invention embodies a substantially U-shape frame having a supporting clamp on the lower end with a horizontally disposed shaft, means for rotating the shaft, means clamping sections of coconut against the end of the shaft, and shredding elements actuated to shredding position by the shaft.

Other features and advantages of the invention will appear from the following description taken in connection with the drawings wherein:

Figure 3 is an end elevational view of the shredder looking toward the handle thereof.

Figure 4 is a plan view of the shredder.

Figure 5 is a detail showing a section taken on line 5—5 of Figure 1 illustrating the mounting of the shredding elements.

Figure 6 is a detail showing a section taken on line 6—6 of Figure 1 showing a section through the shredding knife.

Figure 1:
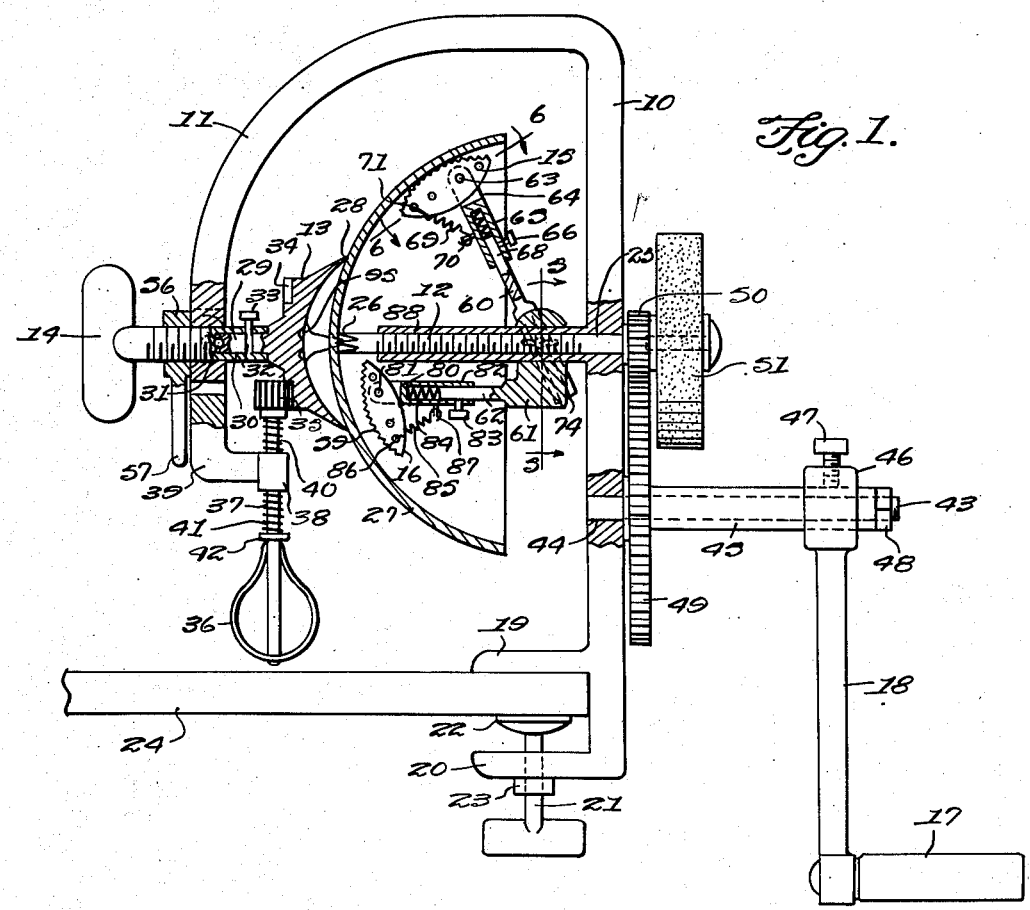
Figure 1 is a side elevational view of the coconut shredder with parts broken away and shown in section and with the section through the parts taken on line 1—1 of Figure 4.
Figure 2:
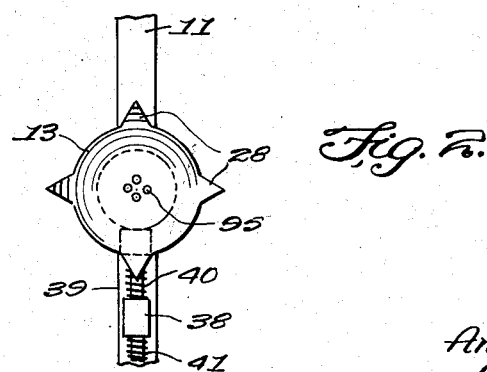
Figure 2 is an elevational view showing the inner end of the coconut gripping element with other parts removed.

Referring now to the drawings wherein like reference characters denote corresponding parts the improved coconut shredder of this invention includes a frame having a post 10 with an upper arcuate section 11, a threaded shaft 12, a coconut gripper 13, a clamp screw 14, shredding knives 15 and 16 and a handle 17 on a crank 18.

The post 10 of the frame is provided with a clamp at the lower end having spaced flanges 19 and 20 with a thumb screw 21 threaded through the flange 20 and the thumb screw is provided with a washer 22 and a lock nut 23. By this means the frame is clamped to the edge of a table as indicated by the numeral 24, as shown in Figure 1.

The shaft 12 is journaled in a bearing 25 in the post 10 and the inner end is provided with spaced fingers 26 that are forced through the meat of a coconut so that they engage the inner surface of the shell, as indicated by the numeral 27 whereby a half or portion of a coconut is forced against the fingers 26 on the end of the shaft by the clamp screw 14 through which the prong 28 of the gripper 13 is rigidly clamped in operative positions.

The gripper 13 is provided with a stub shaft 29 that is journaled in a socket 30 in the end of the screw 14 and a ball 31 is positioned between the inner end of the stub shaft and base of the socket. The stub shaft 29 is also provided with an annular groove 32 into which the end of a screw 33 extends, as shown in Figure 1, to prevent accidental separation of the gripper from the screw. The rear surface of the gripper 13 is provided with radially disposed gear teeth 34 and a beveled pinion 35 is positioned to mesh with the gear teeth whereby upon rotation of the gripper a feeding element 36 on the lower end of a shaft 37 journaled in a bearing 38 in the lower end 39 of the arcuate section 11 of the frame is rotated. The feeder shaft 37 is suspended between springs 40 and 41 on opposite sides of the bearing 38 with the spring 40 engaging the hub of the gear 35 and the spring 41 engaging a collar 42 on the shaft 37.

The shaft 12 is rotated by the handle 17 of the crank 18 through a jack shaft 43 that is mounted in a socket 44 in the post 10 and the shaft provided with a sleeve 45 on which a hub 46 of the crank 18 is secured by a set screw 47. The sleeve 45 is retained on the jack shaft 43 by a lock nut 48.

The inner end of the sleeve 45 is provided with a gear 49 that meshes with a pinion 50 on the shaft 12 whereby upon rotation of the crank the gears rotate the shaft 12.

A grinding wheel 51 is also provided on the end of the shaft 12 which forms a fly wheel and also provides means for sharpening knives, tools, and other implements.

The end 39 of the section 11 of the frame is pivotally mounted by pins 52 and 53 the outer ends of which are threaded and provided with thumb nuts 54 and 55, respectively. With the end 39 mounted in this manner the feeder 36 with the shaft and gear 35 may be swung upwardly to a position above the clamp screw 14 when the beater is not in use. A lock nut 56 with a handle 57 extended therefrom is provided for securing the clamp screw 14 in the position of clamping part of a cocoanut against the fingers 26 on the end of the shaft 12.

The shredding knives 15 and 16 are provided with serrated edges 58 and 59, respectively and the knife 15 is carried by an arm 60 that is pivotally mounted on a base 61 on which the knife 15 is mounted through a stationary arm 62.

The knives are eccentrically positioned with the knife 15 pivotally mounted by a pin 63 in a yoke 64 on the end of a sleeve 65 and the sleeve 65 is positioned over the end of the arm 60 and secured in position by a set screw 66. The yoke is urged outwardly by a spring 67 in the end of the socket 68 in the sleeve 65. The knife 15 is secured in operative position by a spring 69, one end of which is attached to an eye 70 on the sleeve 65, and the other to the end of the knife 15 through an opening 71. The arm 60 is provided with spaced side bars 72 and 73 and the side bars are provided with slots 74 and 75, respectively, that are positioned over studs 76 and 77 on the sides of the base 61, and the side bars are secured in position by thumb nuts 78 and 79, respectively.

The shredding knife 16 on the upper end of the arm 62 is pivotally mounted in a yoke 80 by a pin 81 and a sleeve 82 on the inner end of the yoke is adjustably mounted on the arm 62 by a set screw 83. The sleeve 82 is provided with a spring 84 and a spring 85 holds the shredding knife in operating position, one end being attached to the knife 16 through an opening 86 and the other to the sleeve 82 through an eye 87.

The shaft 12 extends through a mounting tube 88 extended inwardly from the post 10 and the sides of the tube are provided with slots 89 and 90 through which projections 91 and 92 of the base 61 extend as shown in Figure 5 and with the inner surfaces of the projections 91 and 92 meshing with the threads of the shaft 12 the base 61 is advanced toward the section of the coconut when the screw is rotated by the crank.

With the parts arranged in this manner a half or section of a coconut is positioned, as indicated by the numeral 27 with the fingers 26 of the shaft 12 forced through the meat on the inner surface of the shell and with the prongs 28 of the gripper 13 forcing the shell against the fingers 26. With the coconut secured in this manner the shredding knife 15 is positioned to contact the inner surface of the meat of the coconut and as the coconut is rotated by the crank 18 the shredding knife 15 is advanced by the threads of the shaft 12 whereby a shredding action is obtained. As the operation continues the shredding knife 16 moves in contact with the meat of the coconut at the center and substantially all of the meat of the coconut or part thereof is shredded.

The positions of the parts are readily adjustable to correspond with the size and shape of the coconut and with the parts of the coconut readily removed and replaced in this manner a comparatively large quantity of coconuts may be shredded in a relatively short period of time.

When the device is not used for shredding coconuts, knives, tools or implements may be sharpened on the grinding surface of the fly wheel and the beater 36 may be used for beating or mixing material.

It will be understood that modifications may be made in the design and arrangement of the parts without departing from the spirit of the invention.

What is claimed is:

1. A coconut shredder comprising a supporting frame having a vertically disposed post portion and an upper arcuate section extending from the upper end of the post and curved downwardly so that the lower portion of the arcuate section is parallel to and spaced from said post portion, a horizontally disposed shaft journaled in the vertically disposed post of the frame and extending toward the lower portion of said arcuate section, means clamping part of a coconut against the end of the shaft whereby the coconut is rotated as the shaft rotates, means rotating the shaft, a pair of shredding elements carried by the shaft in pivoted relation to each other and positioned to engage the surface of the part of the coconut as the shaft is rotated, and mounting means on the lower end of the vertically disposed post of the frame.

2. A coconut shredder comprising a supporting frame having a vertically disposed post portion and an upper arcuate section extending from the upper end of the post and curved downwardly so that the lower portion of the arcuate section is parallel to and spaced from said post portion, a horizontally disposed shaft journaled in the vertically disposed post of the frame and extending toward the lower portion of said arcuate section, means clamping part of a coconut against the end of the shaft whereby the coconut is rotated as the shaft rotates, means rotating the shaft, a pair of shredding elements carried by the shaft in pivoted relation to each other and positioned to engage the surface of the part of the coconut as the shaft is rotated, means advancing the shredding element toward the part of the coconut, and mounting means on the lower end of the vertically disposed post of the frame.

3. A coconut shredder comprising a supporting frame having a vertically disposed post portion and an upper arcuate section extending from the upper end of the post and curved downwardly so that the lower portion of the arcuate section is parallel to and spaced from said post portion, a horizontally disposed shaft journaled in the vertically disposed post of the frame and extending toward the lower portion of said arcuate section, means clamping part of a coconut against the end of the shaft whereby the coconut is rotated as the shaft rotates, means rotating the shaft, a pair of shredding elements carried by the shaft in pivoted relation to each other and positioned to engage the inner surface of the part of the coconut clamped against the end of the shaft with one shredding element positioned to engage the outer edge of the part of the coconut and the other with part thereof adjacent the center, means advancing the shredding elements toward the part of the coconut, and mounting means on the lower end of the vertically disposed post of the frame.

4. In a coconut shredder, the combination which comprises a supporting frame having a vertically disposed post portion and an upper arcuate section extending from the upper end of the post and curved downwardly so that the lower portion of the arcuate section is parallel to and spaced from said post portion, a horizontally disposed shaft journaled in the vertically disposed post portion of the frame and extending toward the lower portion of said arcuate section, a crank journaled on the vertically disposed post of the frame below said shaft, means rotating the shaft by the crank, an adjusting screw threaded in the lower portion of the arcuate section of the frame, aligned with the shaft and spaced from the outer end thereof, a gripper journaled in the inner end of the adjusting screw and positioned to coact with the inner end of the shaft for clamping sections of coconuts against the end of the shaft, a base having an arm extended therefrom positioned to slide over the shaft, means sliding the base as the shaft is rotated, a shredding element pivotally mounted and resiliently held in the outer end of the arm of the base, another arm pivotally mounted on the base, and a second shredding element pivotally and resiliently mounted in the outer end of the arm pivotally mounted on the base.

5. In a coconut shredder, the combination which comprises a supporting frame having a vertically disposed post portion and an upper arcuate section extending from the upper end of the post and curved downwardly so that the lower portion of the arcuate section is parallel to and spaced from said post portion, a horizontally disposed shaft journaled in the vertically disposed post portion of the frame and extending toward the lower portion of said arcuate section, a crank journaled on the vertically disposed post of the frame below said shaft, means rotating the shaft by the crank, an adjusting screw threaded in the lower portion of the arcuate section of the frame, aligned with the shaft and spaced from the outer end thereof, a gripper journaled in the inner end of the adjusting screw and positioned to coact with the inner end of the shaft for clamping sections of coconuts against the end of the shaft, a base having an arm extended therefrom positioned to slide over the shaft, means sliding the base as the shaft is rotated, a shredding element pivotally mounted and resiliently held in the outer end of the arm of the base, another arm pivotally mounted on the base, a second shredding element pivotally and resiliently mounted in the outer end of the arm pivotally mounted on the base, and a clamp positioned on the lower end of the vertically disposed post of the frame.

ANGEL E. HERNÁNDEZ.
MARCIANO PINCA.

REFERENCES CITED

The following references are of record in the file of this patent:

UNITED STATES PATENTS

| Number | Name | Date |
| --- | --- | --- |
| 1,304,079 | McLean | May 20, 1919 |
| 1,438,714 | Olds, Jr. | Dec. 12, 1922 |
| 1,511,137 | Pichler | Oct. 7, 1924 |
| 1,554,571 | Gentel | Sept. 22, 1925 |
| 2,178,889 | Gabrieau | Nov. 7, 1939 |
| 2,243,025 | Wilson | May 20, 1941 |
| 2,299,761 | McCauley | Oct. 27, 1942 |
| 2,475,559 | Wilson | July 5, 1949 |

FOREIGN PATENTS

| Number | Country | Date |
| --- | --- | --- |
| 264,372 | Italy | Apr. 26, 1929 |